(12) United States Patent
Na

(10) Patent No.: US 7,836,785 B2
(45) Date of Patent: Nov. 23, 2010

(54) GEAR TRAIN

(76) Inventor: Risi Na, No. 6 Zhongshan Xi Road, Room 3, Unit 3, Building 1, Hohhot (CN) 010020

( * ) Notice: Subject to any disclaimer, the term of this patent is extended or adjusted under 35 U.S.C. 154(b) by 430 days.

(21) Appl. No.: 11/934,841

(22) Filed: Nov. 5, 2007

(65) Prior Publication Data

US 2008/0087121 A1 Apr. 17, 2008

Related U.S. Application Data

(63) Continuation of application No. PCT/CN2006/000814, filed on Apr. 27, 2006.

(30) Foreign Application Priority Data

May 5, 2005 (CN) .......................... 2005 1 0069900

(51) Int. Cl.
*F16H 27/04* (2006.01)

(52) U.S. Cl. .......................... 74/414; 74/421 R; 74/460; 74/665 GA

(58) Field of Classification Search ................... 74/426, 74/431, 435, 436, 437, 458, 462, 665 F, 665 G, 74/665 GA, 665 H, 665 S, 414, 421 R, 460
See application file for complete search history.

(56) References Cited

U.S. PATENT DOCUMENTS

| | | | | |
|---|---|---|---|---|
| 1,016,545 A | * | 2/1912 | Bultman | 74/426 |
| 4,567,783 A | * | 2/1986 | Hart | 74/425 |

* cited by examiner

*Primary Examiner*—William C Joyce
(74) *Attorney, Agent, or Firm*—Matthias Scholl P.C.; Matthias Scholl

(57) ABSTRACT

A gear train comprising a driving gear and at least two driven gears respectively engaged with the driving gear. Multiple teeth of the driving gear can be accommodated between two adjacent teeth of each driven gear, the number of said teeth of the driving gear that can be accommodated between two adjacent teeth of each driven gear is equal to the number of the driven gears. The engagement of the driving gear with each driven gear is in order and in sequence, i.e., the driving gear engages each driven gear alternately. The invention teaches reduction of the number of the teeth of the driving gear.

4 Claims, 1 Drawing Sheet

GEAR TRAIN

CROSS-REFERENCE TO RELATED APPLICATIONS

This application is a continuation of International Patent Application No. PCT/CN2006/000814 with an international filing date of Apr. 27, 2006, designating the United States, now pending, and further claims priority benefits to Chinese Patent Application No. 200510069900.2, filed May 5, 2005. The contents of the aforementioned specifications are incorporated herein by reference.

BACKGROUND OF THE INVENTION

1. Field of the Invention

The invention relates to a power transfer mechanism, and more particularly to a system of gears.

2. Description of the Related Art

Multi-axial transfer of movement and rotational speed changes are normally achieved by using a gear train, such as one-to-one direct gear train, or one-to-many direct gear train.

In one-to-one direct gear train, assuming no frictional losses, energy transferred from the driving gear to a driven gear is equal to the energy generated by the driving gear. In one-to-more direct gear train, such as one-to-two direct gear train or one-to-three direct gear train, assuming no frictional losses, energy generated by the driving gear will be averagely transferred to each driven gear; that is, in one-to-two direct gear train, the energy transferred from the driving gear to each driven gear is about half of the energy generated by the driving gear, and in one-to-three direct gear train, energy transferred from the driving gear to each driven gear is about third of the energy generated by the driving gear.

In a conventional gear train, the tooth pitch of the driving gear is equal to the tooth pitch of the driven gear, that is, one tooth of the driving gear corresponds to and is engaged with one tooth of each driven gear. Referring to FIG. 2, a conventional gear train comprises a driving gear 5 and a driven gear 4 which are engaged with each other. The driving gear 5 is turned counterclockwise by an external force, and the driven gear 4 is turned clockwise by the driving gear 5. Therefore, energy is transferred from the driving gear 5 to the driven gear 4.

As shown in FIG. 2, in a conventional meshing gear train one tooth of the driving gear 5 corresponds to and is engaged with one tooth of the driven gear 4, and the number of teeth in the driving gear 5 is equal to the number of teeth in the driven gear 4. This is to say that the tooth pitch of the driving gear 5 defines the tooth pitch of the driven gear 4 and vice versa. However, this is often not the optimal solution for reducing manufacturing and operating costs of gear trains.

SUMMARY OF THE INVENTION

In view of the above-described problems, it is one objective of the invention to provide a gear train with an eye toward simplifying the manufacturing process and reducing the manufacturing cost.

To achieve the above objectives, in accordance with one embodiment of the invention, provided is a gear train, comprising a driving gear and at least two driven gears each engaged with the driving gear.

In certain embodiments of the invention, more than one teeth of the driving gear are accommodated between two adjacent teeth of each driven gear.

In certain embodiment of the invention, the number of the teeth of the driving gear accommodated between two adjacent teeth of each driven gear is equal to the number of the driven gears.

In certain embodiment of the invention, the engagement of the driving gear with each driven gear is in order and in sequence.

In certain classes of this embodiment, the driving gear and the driven gears are spur gears.

In certain classes of this embodiment, the driving gear and the driven gears are helical gears.

In certain classes of this embodiment, the driven gears are uniformly distributed with respect to the driving gear.

In certain classes of this embodiment, the number of the driven gears is two, and the two driven gears are symmetrically disposed on the opposite sides of the driving gear.

In certain classes of this embodiment, the number of the driven gears is two, and two adjacent teeth of each driven gear can accommodate two teeth of the driving gear.

In certain classes of this embodiment, the driving gear is continuously engaged with each driven gear via inertial forces of rotation.

In certain classes of this embodiment, the tooth pitch of the driven gear is set equal to double or multiple of the tooth pitch of the driving gear, so the number of the teeth of the driven gears is reduced due to increased pitch of the driven gear. Since the engagement relationship between the driving gear and the driven gears is changed into one where a driving gear engaged with all the driven gears in order and in sequence, this can effectively simplify the manufacturing process of the driven gear, and reduce the cost of the manufacturing.

BRIEF DESCRIPTION OF THE DRAWINGS

The invention is described hereinafter with reference to accompanying drawings, in which.

DETAILED DESCRIPTION OF THE INVENTION

Figure 1:
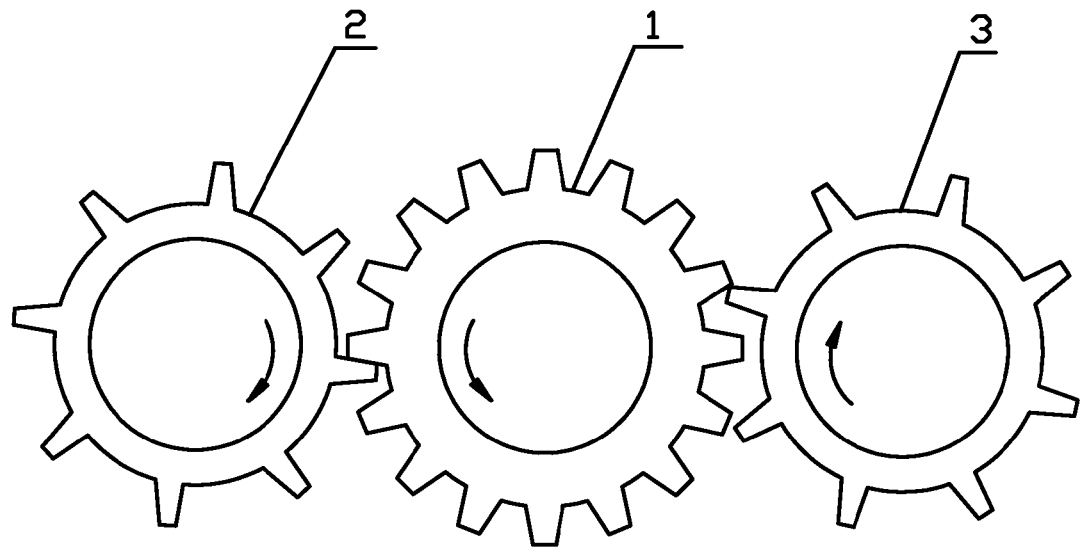
FIG. 1 is a schematic diagram of a gear train in accordance with an exemplary embodiment of the present invention.
Figure 2:
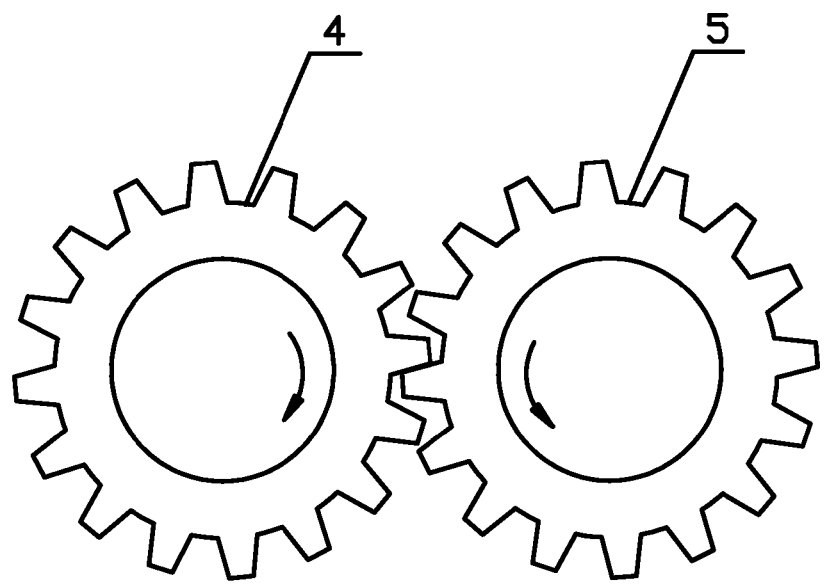
FIG. 2 is a schematic diagram of a conventional gear train of prior art.

A gear train mechanism of the present invention is a one-to-more gear train mechanism, which includes a driving gear and at least two driven gears. The central idea of the invention is the implementation of increased tooth pitch of the driven gears with respect to the driving gear. In one-to-many direct gear train of the present invention, the engagement relationship between the driving gear and the driven gears is changed, that is, when one of the driven gears is engaged with the driving gear, the other driven gears are necessarily disengaged with the driving gear. The motion transfer from the driving gear to each driven gear occurs in order and in sequence.

In a gear train mechanism of one driving gear turning one driven gear, increasing the tooth pitch of the driven gear to double or multiple that of the driving gear reduces the cost of manufacturing and simplifies the manufacturing process.

In an exemplary embodiment of the invention, for a gear train of one driving gear turning multiple driven gears, the engagement of the driving gear with each driven gear is in order and in sequence, and the tooth pitch of the driven gears is determined by the number of the driven gears.

In the present invention, if the gear train comprises one driving gear turning two driven gears, the tooth pitch of each driven gear is a double of the tooth pitch of the driving gear, that is, each tooth of the driven gear is engaged with two teeth of the driving gear. If the gear train comprises one driving gear turning three driven gears, the tooth pitch of each driven gear is three times that of the driving gear, that is, each tooth of the driven gear is engaged with three teeth of the driving gear. Multiple teeth of the driving gear are accommodated between two adjacent teeth of each driven gear, and the number of the teeth of the driving gear accommodated between two adjacent teeth of each driven gear is equal to the number of the driven gears in the gear train.

In a gear train mechanism comprising one driving gear turning two driven gears, the two driven gears are named the first driven gear and the second driven gear. In order to achieve gear engagement in sequence, the gear train mechanism must be assembled so that when the driving gear is about to engage with the first driven gear, the driving gear is about to disengage with the second driven gear. In this case, when the first driven gear is engaged with the driving gear, the second driven gear is disengaged with the driving gear. As the gears turn due to inertial forces of rotation, the driving gear is engaged with the second driven gear, and disengaged with the first driven gear, simultaneously. Accordingly, a one-to-two gear train is equivalent to two one-to-one gear trains.

In a gear train mechanism comprising one driving gear turning three driven gears, the three driven gears are named: the first driven gear, the second driven gear, and the third driven gear. In order to achieve gear engagement in sequence, the gear train mechanism is assembled so that when the driving gear is about to engage with the first driven gear, the driving gear is about to disengage with the second driven gear and the third driven gear. In this case, when the first driven gear is engaged with the driving gear, the second driven gear and the third driven gear are necessarily disengaged with the driving gear. As the gears turn due to inertial forces of rotation, the driving gear is engaged with the second driven gear, and disengaged with the first driven gear simultaneously; and then, the driving gear is engaged with the third driven gear, and disengaged with the second driven gear simultaneously. Accordingly, the one-to-three gear train is equivalent to three one-to-one gear trains.

A gear train comprising one driving gear turning more than three driven gears is similar in construction and operation to the above description; therefore, descriptions of one driving gear turning more than three driven gear train are omitted.

Furthermore, for better stability and continuity in the gear train mechanism, in an exemplary embodiment, the driving gear and the driven gears are helical gears, and the driven gears are uniformly distributed with respect to the driving gear. In the gear train mechanism comprising one driving gear turning two driven gears, the two driven gears are symmetrically disposed at the opposite sides of the driving gear.

Referring to FIG. 1, the gear train mechanism comprises the driving gear 1, the first driven gear 2, and the second driven gear 3, wherein the driving gear turns the two driven gears. The tooth pitch of the first driven gear 2 and the tooth pitch of the second driven gear 3 are each double that of the driving gear 1. When engaged, one tooth of the first driven gear 2 or one tooth of the second driven gear 3 can accommodate two teeth of the driving gear 1.

In order to ensure a better engagement in the assembly, the direction of motion of the helix angle which is disposed in the first driven gear 2 is the same to that of the helix angle which is disposed in the second driven gear 3, and the direction of motion of the helix angle which is disposed in the driving gear 1 is opposite to those disposed in the first driven gear 2 and the second driven gear 3.

As shown in FIG. 1, when the driving gear 1 is about to engage with the first driven gear 2, the second driven gear 3 is about to disengage with the driving gear 1. Furthermore, when the first driven gear 2 is engaged with the driving gear 1, the second driven gear 3 is necessarily disengaged with the driving gear 1. As the gears turn due to inertial forces of rotation, the driving gear 1 is disengaged with the first driven gear 2 and engaged with the second driven gear 3 simultaneously. Accordingly, after putting the gear train mechanism in motion, a one-to-two gear train is equivalent to two one-to-one gear trains, and the driving gear is continuously engaged with each driven gear via inertial forces of rotation.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A gear train comprising: a driving gear, and two driven gears each engaged with the driving gear, wherein two adjacent teeth of each driven gear accommodate therebetween two teeth of the driving gear; and the driving gear engages alternately with each driven gear.

2. The gear train mechanism of claim 1, wherein the driven gears are uniformly distributed with respect to the driving gear.

3. The gear train mechanism of claim 1, wherein the two driven gears are symmetrically disposed on opposite sides of the driving gear.

4. The gear train mechanism of claim 1, wherein the driving gear is continuously engaged with each driven gear via inertial forces of rotation.

* * * * *